July 3, 1934.  D. M. FREEMAN ET AL  1,965,310
CANDY CUTTING MACHINE
Filed Jan. 14, 1933    2 Sheets-Sheet 2

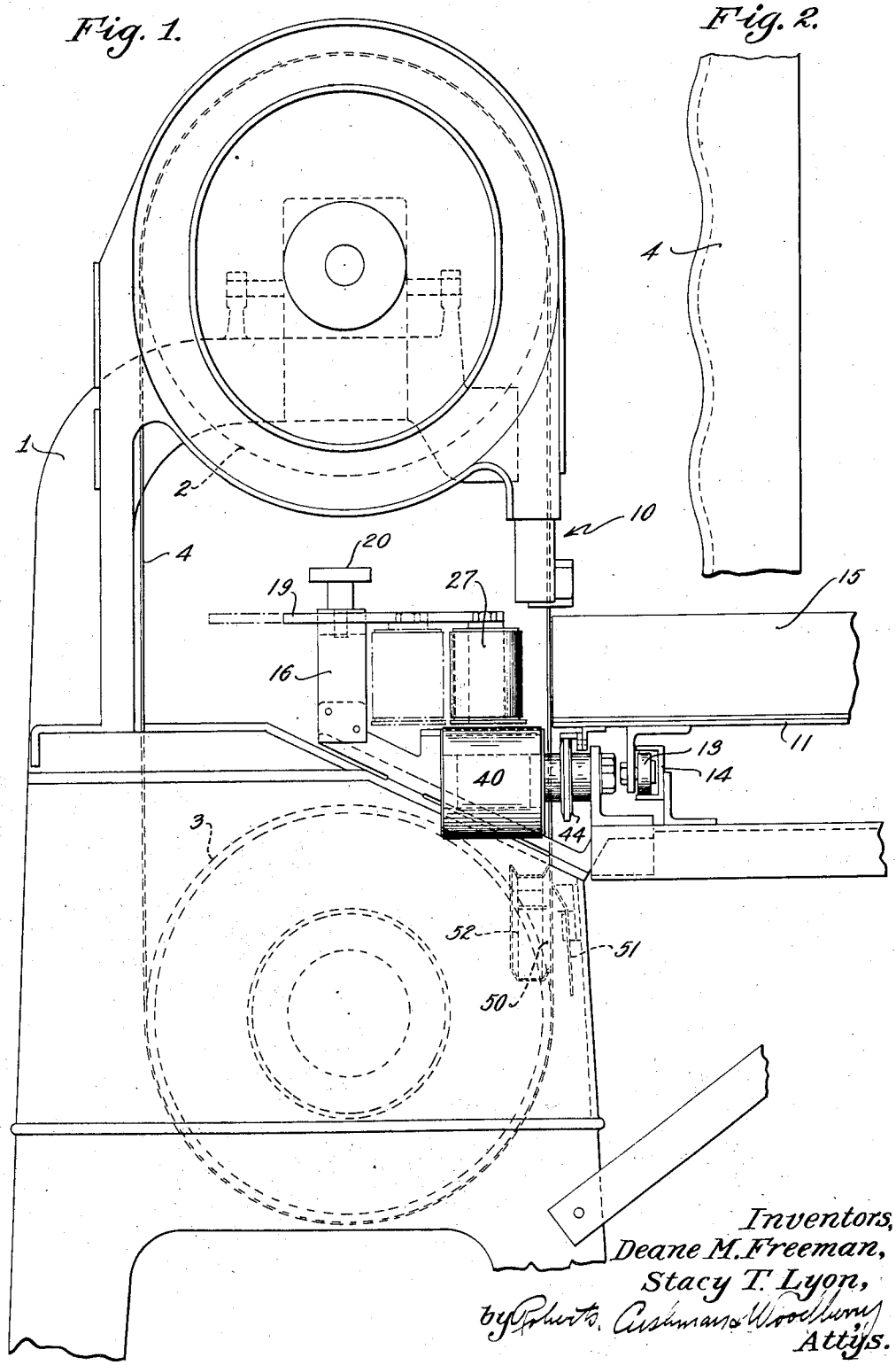

Inventors,
Deane M. Freeman,
Stacy T. Lyon,
by Roberts, Cushman & Woodbury.
Attys.

Patented July 3, 1934

1,965,310

UNITED STATES PATENT OFFICE 1,965,310

CANDY CUTTING MACHINE

Deane M. Freeman, West Newton, and Stacy T. Lyon, Melrose, Mass.

Application January 14, 1933, Serial No. 651,740

15 Claims. (Cl. 107—20)

This invention relates to a machine for cutting slabs of candy, such as nougat, into strips or individual pieces, and is particularly adapted for employment with sticky or chewy candy, which may or may not include nuts.

Candy such as nougat has heretofore been cut upon machines employing cutting disks. These machines are unsatisfactory since the disks overheat if scrapers are constantly in engagement with the same, accordingly very frequent hand scraping is commonly necessary, with the consequent danger of cutting of the hand of the workman or operator thus scraping a cutting disk. Furthermore, disks of this type, due to their tapered form, tend to crumble the candy and do not afford clean cuts through nuts, often tearing the nuts to pieces. Since such a cutting disk is materially thicker adjoining its central portion, it is not effective in cutting relatively thick slabs of candy. Machines of this type are particularly unsatisfactory when the humidity is relatively high due to the tendency of the candy to stick to the disk and crumble. Furthermore, grease is commonly employed with these machines, which often causes deterioration in the flavor of the candy and, in certain cases, causes it to turn rancid, being particularly harmful to a chocolate coating.

The present invention affords a cutting machine wherein the cutting operation may be performed with facility and wherein there is no necessity for frequent hand scraping of the cutting element or knife or of greasing the same. Furthermore, the machine is adapted to cut relatively thick slabs of candy and to cut cleanly through nuts embedded in the same. This machine permits the cut pieces of candy to have square edges and avoids the crumbling characteristics of the prior machines.

To permit these desirable results we employ a band-knife, preferably having a slightly scalloped edge, which moves at high speed and is effective in cutting through the slab or piece of candy. Scrapers are provided automatically to remove any candy film which tends to cling to the band-knife, thus maintaining the knife in such a condition that a clean cut is assured and avoiding the collection of a film between the knife and the pulleys over which it passes and consequent dislodgment or breakage of the knife.

An important feature of the invention is the provision of edge guiding means adjustable to permit ready variation in the width of the strip of candy being cut, for example, from the slab and affording a minimum of frictional resistance to the movement of this strip as it leaves the cutting knife.

Another important feature of the invention is the provision of conveyor means to remove the cut strip from the knife. This conveyor means preferably is associated with a movable work-table and automatically moves in one direction in response to the movement of the table. Accordingly the candy may be manually fed to the knife, the speed of cutting being gauged by the operator and the speed of removal of the cut material being dependent upon the speed with which the table is moved and the candy is cut.

In the accompanying drawings:

Fig. 1 is a side elevation of a machine embodying the principles of this invention;

Fig. 2 is an elevational detail of a portion of the band-knife employed in this machine;

Figure 6:
Fig. 6 is a sectional view of the knife.

In the accompanying drawings, the numeral 1 indicates a suitable frame upon which pulleys 2 and 3 may be mounted to receive a band-knife 4 therebetween, this knife having vertical runs extending between the pulleys. As shown in Figs. 2 and 6, the knife may be beveled upon one edge, which has shallow scallops therein; for example, the depth of these scallops may be of the order of one-eighth of an inch. Any suitable driving means such as an electric motor 7 may be operatively connected to one of the pulleys, as the lower pulley 3, to drive the knife 4. Suitable guiding and supporting means 10, which may be of the conventional type employed in band saws or with conventional band-knives, may be provided to support the vertical run of the knife at the front of the machine.

Below the supporting means 10 we may provide a work-table 11 supported on rollers 13, these rollers engaging suitable parallel track members 14. Thus the table 11 is adapted to be moved back and forth manually in close juxtaposition to the outer face of the vertical run of blade 4. At one end of the table (Fig. 3 we provide an upstanding plate 15 adapted to engage the edge of a slab S of nougat to press the same in the direction of the cutting edge of knife 4, as the table is advanced to the right, as viewed in Fig. 3.

Figure 7:
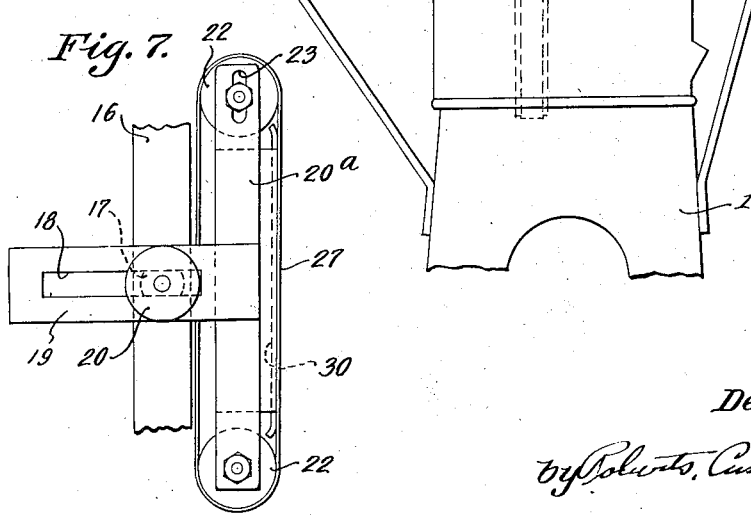
Fig. 7 is a top view showing the arrangement of the edge guiding means.

Mounted upon the frame of the machine is an upstanding bracket 16 (Fig. 1) carrying a fixed elongate key 17 (Fig. 7) engaging a slot 18 in a horizontal bar 19. A hand screw 20 is threaded into the key 17 and is adapted to clamp the slotted bar in adjusted position in relation to bracket 16. The outer end of bar 19 carries a support 20ᵃ at the end of which a pair of rolls 22 are mounted. A slotted connection 23 may be provided in the member 20ᵃ to permit the relative adjustment of rolls 22, if desired. A belt 27 of material which has little tendency to stick to nougat, such, for example, as oilcloth, is wrapped about pulleys 22, having a run disposed in a vertical plane parallel to the vertical run of the knife 4 at the front of the machine. The member 20ᵃ may support a vertical plate 30 positioned to engage this run of belt 27, thus to prevent stretching or bulging of the same. The belt 27 as thus supported by the plate 30 affords means to engage the inner edge of a slab S of nougat in the position, for example, illustrated in Fig. 3, thus providing a readily adjustable edge guide to determine the width of the strip which is to be cut from the slab S. Obviously the hand screw 20 affords means allowing convenient adjustment of this guide to permit variation in the width of the strip to be cut from the slab.

Figure 5:
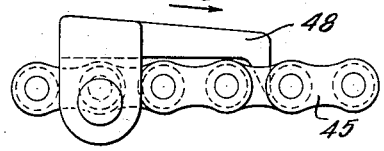

At the opposite side of knife 4 from the work-table 11 is a conveyor belt 40 which has its ends wrapped about rolls 41 supported on the frame of the machine. The intermediate part of the lower run of this belt engages an idler pulley 42 (Fig. 3) in order properly to clear the portion of the frame which supports bracket 16. Fixed to the pulleys 41 are sprockets 44 about which a link chain 45 is wrapped. These sprockets have somewhat smaller diameters than rolls 41. A lug 46 secured to the lower part of feed table 11 carries a pivotally mounted pawl 48 which is adapted to engage the chain 45 to move the chain as the feed table is advanced, (Fig. 5) thus causing rotation of sprockets 44 and pulleys 40 and consequent movement of the upper run of belt 40 in the same direction as the advancing feed table but at a somewhat greater rate of speed.

Figure 4:
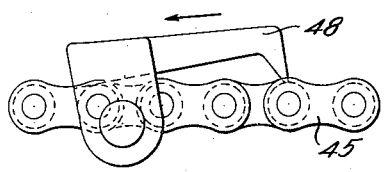
Figs. 4 and 5 are elevational details of a portion of the ratchet means associated with the conveyor means of the machine.

The belt 40 therefore is adapted to engage a strip of candy as it is being cut from the slab S and to move the same away from the knife 4 as well as from the slab itself. Any suitable conveyor may be arranged adjoining the end of this conveyor means to receive the candy strip therefrom. When the work-table 11 is moved back to its retracted position, i. e., the position shown in Fig. 3, pawl 44 rides over the links of chain 45, as shown in Fig. 4, so that movement of the belt 40 is avoided. Consequently, upon the advance movement of the work-table another portion of the belt is advanced past the knife to receive another slice of candy.

Disposed below the belt 40 are suitable scrapers 50 and 51. As shown, the scraper 50 may be provided by the edge of an inclined trough 52 which is mounted upon a fixed bracket 53. Thus a scraper is provided to remove any film which tends to collect upon the surface of the blade and to divert the same from the region of the lower pulley 3, while the scraper 51 provides a sheet metal edge engaging the outer face of the blade to remove any adhering candy film therefrom. If desired, the effective edges of scrapers 50 and 51 may be slightly offest in relation to each other.

In the operation of this machine, a candy slab S is placed upon table 11 with its edge in engagement with the plate 15 and with an adjoining edge pressed against the edge-guiding belt 27. The motor is operated so that it may drive the knife 4 at a relatively high speed, for example, of the order of six thousand feet per minute, and the feed table 11 is advanced to bring the slab S into engagement with the scalloped cutting edge of the knife 4. Thereupon cutting of a strip from the slab is initiated, this strip resting upon the belt 40 which is moving at a somewhat greater speed than the table 11 so that the cut strip may be moved not only away from the knife but also from the slab after it has been separated by the knife from the slab. During this movement of the strip being cut, it engages the edge guiding belt 27 which is free to move in frictional engagement with the partially cut strip. The conveyor belt 40 may deliver this cut strip to any suitable means, such as another conveyor belt, a pan, or the like.

Figure 3:
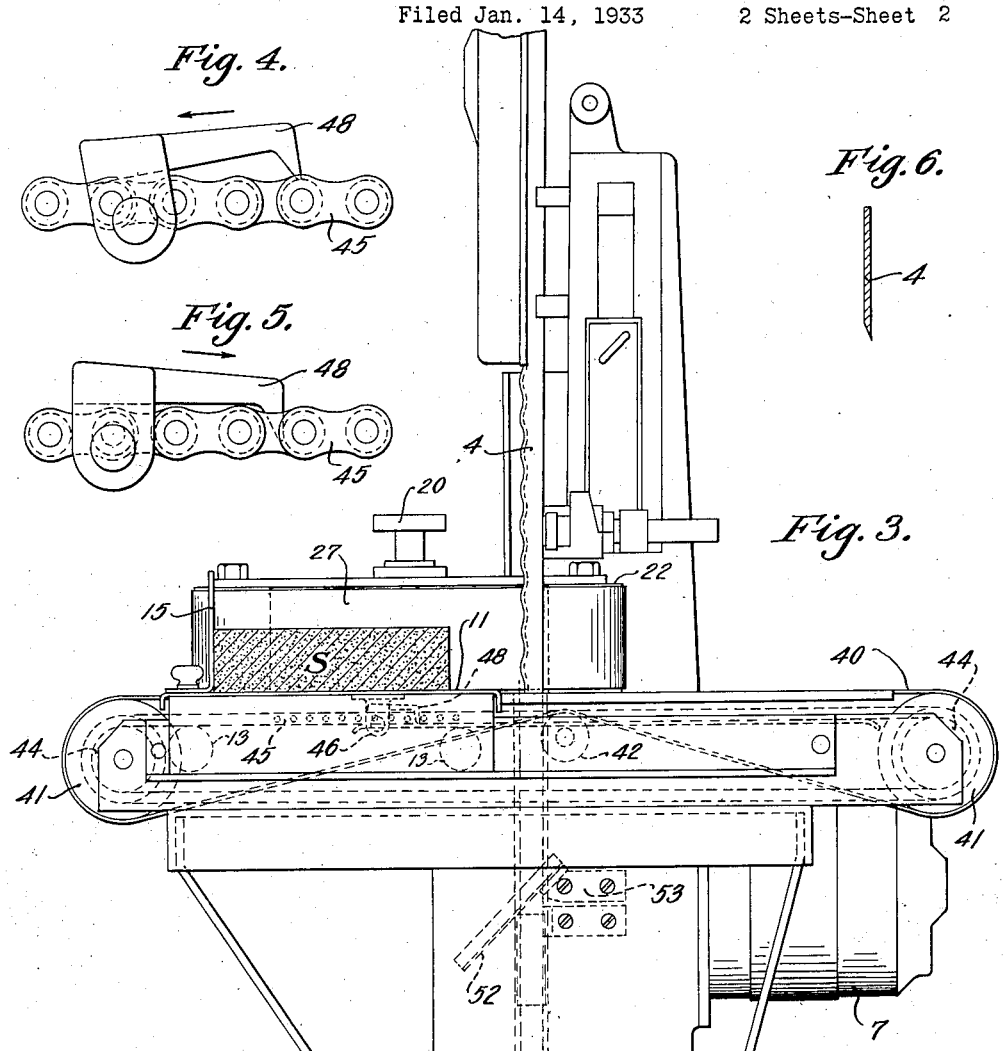
Fig. 3 is a front elevation of the major portion of the machine.

After this cutting operation the work-table 11 is moved back to its original position, illustrated in Fig. 3, and the slab is moved over so that its recently cut edge is engaged with the belt 27, whereupon the operation is repeated.

After the slab has been cut into a plurality of strips in this manner the strips may be assembled, if desired, to provide an oblong of candy strips, which is then placed on the conveyor table with the severed edges of the strips extending at right angles to the plane of the adjoining vertical run of the knife, and the cutting operation may then be repeated to divide the strips into separate pieces of square or rectangular shape.

A machine of this character is particularly advantageous in permitting the clean cutting of candy such as nougat without objectionable tendency of the candy to crumble and without requiring special attention to the scraping means. The scrapers afforded by this invention permit automatic scraping of the blade, and the length of the blade is sufficient so that the heat generated by the scraping operation may be readily dissipated. The blade itself with its scalloped edge moving at high speed affords a rapid succession of minute shearing cuts, and is thus effective in cutting the candy since the speed of feeding the candy may be comparatively low in relation to the speed of the knife. The employment of a manually controlled feed table permits variation in the speed of feeding the candy to suit the cutting effect of the blade and the thickness and consistency of the candy. The edge guide belt 27 is advantageous in permitting ready movement of the partially cut strip and the slab and permitting quick gauging of the width of the strip that is to be cut, while the conveyor 40, responsive to the manual movement of the work-table, is advantageous in permitting proper removal of the cut material and ready separation of the same from the slab.

This invention accordingly affords an effective candy cutting machine which is particularly adapted to cut the candy commonly known as nougat, which has not been readily and satisfactorily cut by machines heretofore in use.

We claim:

1. A machine for cutting nougat candy or the like comprising a frame, a band-knife, pulleys for supporting and driving the knife, a work table disposed adjoining a run of the knife, a conveyor disposed upon the opposite side of said run of the knife, a support for the table permitting its movement in relation to the cutting edge of the knife, and means interconnecting the table and conveyor to cause a movement of the conveyor in one direction in response to a corresponding movement of the table whereby the conveyor may receive a strip being cut from a slab of candy carried by the table.

2. A machine for cutting nougat candy or the like comprising a frame, a band-knife, pulleys for supporting and driving the knife, a work table disposed adjoining a run of the knife, a manually movable conveyor disposed upon the opposite side of said run of the knife, a support for the table permitting its movement in relation to the cutting edge of the knife, and means interconnecting the table and conveyor to cause a movement of the conveyor in one direction in response to a corresponding movement of the table whereby the conveyor may receive a strip being cut from a slab of candy carried by the table, said means being arranged so that the conveyor remains stationary when the table is moved in the opposite direction.

3. A machine for cutting nougat candy or the like comprising a frame, a band-knife, pulleys for supporting and driving the knife, a work table disposed adjoining a run of the knife, a conveyor disposed upon the opposite side of said run of the knife, a support for the table permitting its movement in relation to the cutting edge of the knife, and means interconnecting the table and conveyor to cause a movement of the conveyor in one direction in response to a corresponding movement of the table whereby the conveyor may receive a strip being cut from a slab of candy carried by the table, said means being arranged so that the conveyor moves faster than the table in said direction and so that the conveyor remains stationary when the table is moved in the opposite direction.

4. A machine for cutting candy such as nougat comprising a frame, pulleys supported upon the frame, a band-knife wrapped around the pulleys, a movable work table disposed adjoining a run of the knife, a conveyor belt having a run adjoining the table but on the opposite side of said run of the knife, said table being movably mounted upon the frame and connecting means to cause movement of the belt in one direction in response to the table movement in the same direction in relation to the frame.

5. A machine for cutting candy such as nougat comprising a frame, pulleys supported upon the frame, a band-knife wrapped around the pulleys, a manually movable work table disposed adjoining a run of the knife, a conveyor belt having a run disposed adjoining the table but on the opposite side of said run of the knife, said table being movably mounted upon the frame and means to cause movement of the belt in one direction as the table moves in relation to the frame, said means being arranged to cause said run of the conveyor belt to move faster than the table when the table is moving in one direction and to permit the belt to remain stationary when the table is moving in the opposite direction.

6. A machine for cutting candy such as nougat comprising a frame, pulleys supported upon the frame, a band-knife wrapped around the pulleys, a movable work table disposed adjoining a run of the knife, a conveyor belt having a run disposed adjoining the table but on the opposite side of said run of the knife, said table being movably mounted upon the frame and means to cause movement of the belt in one direction as the table moves in relation to the frame, said means comprising sprockets associated with rolls upon which the conveyor belt is mounted, a chain wrapped about the sprockets, and a ratchet pawl movable with the table and effective to cause movement of the chain, rotation of the sprocket and rolls and movement of the belt in one direction.

7. A machine for cutting candy such as nougat comprising a frame, pulleys supported upon the frame, a band-knife wrapped around the pulleys, a manually movable work table disposed adjoining a run of the knife, a conveyor belt having a run disposed adjoining the table but on the opposite side of said run of the belt, said table being movably mounted upon the frame, and means to cause movement of the belt in one direction as the table moves in relation to the frame, said means comprising sprockets associated with rolls upon which the conveyor belt is mounted, a chain wrapped about the sprockets and a ratchet pawl movable with the table and effective to cause movement of the chain, rotation of the sprocket and rolls a movement of the belt in one direction, said sprockets having diameters smaller than the diameters of the corresponding rolls so that the belt moves faster than the work table.

8. A machine for cutting nougat candy or the like comprising a band-knife, pulleys for supporting and driving the knife, a work table disposed adjoining a run of the knife, a conveyor disposed upon the opposite side of said run of the knife, a support for the table permitting its movement in relation to the cutting edge of the knife and means interconnecting the table and conveyor to cause a movement of the conveyor in one direction in response to a corresponding movement of the table whereby the conveyor may receive a strip being cut from a slab of candy carried by the table, and scrapers disposed in engagement with said run of the knife to remove any film adhering thereto.

9. A machine for cutting nougat candy or the like comprising a band-knife having a beveled cutting edge with shallow scallops therein, pulleys for supporting and driving the knife, a work table disposed adjoining a run of the knife, a conveyor disposed upon the opposite side of said run of the knife, a support for the table permitting its movement in relation to the cutting edge of the knife, and means interconnecting the table and conveyor to cause a movement of the conveyor in one direction in response to a corresponding movement of the table, whereby the conveyor may receive a strip being cut from a slab of candy carried by the table.

10. A machine for cutting nougat candy or the like comprising a band-knife, having a beveled cutting edge with shallow scallops therein, pulleys for supporting and driving the knife, a work table disposed adjoining a run of the knife, a conveyor disposed upon the opposite side of said run of the knife, a support for the table permitting its movement in relation to the cutting edge of the knife, and means interconnecting the table and conveyor to cause a movement of the conveyor in one direction in response to a corresponding movement of the table, whereby the conveyor may receive a strip being cut from a slab of candy carried by the table, and an edge guide disposed adjoining the conveyor and comprising a belt having a run in a plane parallel to said run of the knife.

11. A machine for cutting candy such as nougat comprising a support, a pair of pulleys carried by the support, a band-knife wrapped about the pulleys and having a run extending therebetween, a work table disposed adjoining said run, an edge guide comprising a belt, pulleys for supporting said belt, said belt having a run parallel to the plane of said run of the knife, said belt being formed of material which has little tendency to adhere to candy.

12. A machine for cutting candy such as nougat comprising a support, a pair of pulleys mounted on the support, a band-knife wrapped about the pulleys and having a run extending therebetween, a work table disposed adjoining said run, an edge guide in the form of a belt having a run parallel to said run of the knife, a bracket adjustably mounted upon the support for movement toward and away from said run of the knife, rolls mounted on said bracket and supporting said belt with its run parallel to said run of the knife.

13. A machine for cutting candy such as nougat comprising a support, a pair of pulleys mounted on the support, a band-knife wrapped about the pulleys and having a run extending therebetween, a work table disposed adjoining said run, an edge guide in the form of a belt having a run parallel to said run of the knife, a bracket adjustably mounted upon the support for movement toward and away from said run of the knife, rolls mounted on said bracket and supporting said belt with its run parallel to said run of the knife and a backing plate carried by said bracket and positioned to engage the inner face of said run of the belt.

14. A machine for cutting candy, such as nougat, comprising a support, a pair of pulleys mounted on the support, a band-knife wrapped around the pulleys and having a run extending therebetween, a manually movable work table disposed adjoining said run, a conveyor belt disposed adjoining said run of the knife but opposite to said work table, means interconnecting said conveyor belt and table to cause movement of the belt in response to movement of the table in one direction but to permit the belt to remain stationary when the table moves in the opposite direction, and an edge guide in the form of a belt disposed adjoining the conveyor belt and providing a run parallel to said run of the knife, rolls supporting the edge guiding belt, and a bracket upon which said rolls are mounted.

15. A machine for cutting candy, such as nougat, comprising a support, a pair of pulleys mounted on the support, a band-knife wrapped around the pulleys and having a run extending therebetween, said knife having a cutting edge with shallow scallops therein, a manually movable work table disposed adjoining said run, a conveyor belt disposed adjoining said run of the knife but opposite to said work table, means interconnecting said conveyor belt and table to cause movement of the belt in response to movement of the table in one direction but to permit the conveyor to remain stationary when the table moves in the opposite direction, an edge guide in the form of a belt disposed adjoining the conveyor belt and providing a run parallel to said run of the knife, rolls supporting the edge guiding belt and a bracket upon which said rolls are mounted, and scrapers engaging opposite faces of said run of the knife below the work table to remove any candy film adhering to the knife.

DEANE M. FREEMAN.
STACY T. LYON.